United States Patent [19]
Falso

[11] Patent Number: 5,131,552
[45] Date of Patent: Jul. 21, 1992

[54] OUTDOOR CONTAINER FOR RECYCLING

[76] Inventor: Leona S. Falso, Box 307, Washington, Pa. 15301

[21] Appl. No.: 379,637

[22] Filed: Jul. 14, 1989

[51] Int. Cl.$^5$ ............................................. B65F 1/08
[52] U.S. Cl. ................................. 220/23.4; 220/908
[58] Field of Search ............... 220/1 T, 20, 22, 23.4, 220/DIG. 6, 90, 94 A, 94 R, 85 CH

[56] References Cited

U.S. PATENT DOCUMENTS

| | | | |
|---|---|---|---|
| 826,761 | 7/1906 | Brown | 100/34 |
| 2,535,260 | 12/1950 | Braswell | 220/90 |
| 2,572,486 | 10/1951 | Isaac | 220/94 R |
| 2,636,432 | 4/1953 | Sherer | 100/34 |
| 3,081,394 | 3/1963 | Arel | 220/85 CH |
| 3,236,405 | 2/1966 | Reil | 220/23.4 |
| 3,402,848 | 9/1968 | Busey | 220/1 T |
| 3,591,194 | 7/1971 | Vega | 220/1 T |
| 3,823,973 | 7/1974 | Ramer | 220/1 T |
| 3,856,173 | 12/1974 | Deane et al. | 220/23.4 |
| 3,866,936 | 2/1975 | Hedges | 220/1 T |
| 3,893,615 | 7/1975 | Johnson | 220/20 |
| 3,894,650 | 7/1975 | Crump | 220/90 |
| 3,904,218 | 9/1975 | Kostic | 220/1 T |
| 3,908,853 | 9/1975 | Keesling | 220/DIG. 6 |
| 4,113,125 | 9/1978 | Schiller | 220/22 |
| 4,351,539 | 9/1982 | Rodolakis | 220/1 T |
| 4,428,493 | 1/1984 | McDonough | 220/20 |
| 4,519,520 | 5/1985 | Hill | 220/85 CH |
| 4,520,945 | 6/1985 | Hodge | 220/1 T |
| 4,561,556 | 12/1985 | Bendix | 220/90 |
| 4,593,833 | 6/1986 | Hill | 220/85 CH |
| 4,801,034 | 1/1988 | Sandomeno | 220/23.83 |
| 4,836,394 | 6/1989 | Glomski | 220/1 T |

Primary Examiner—Stephen Marcus
Assistant Examiner—S. Castellano
Attorney, Agent, or Firm—William J. Ruano

[57] ABSTRACT

A three sided, trapezoidal shaped storage container having an open front and housing three small, removable trapezoidal shaped storage bins for storing recyclable household water products such as glass, plastic, newspaper and aluminum cans. Said container has a hinged lid which, when in the closed position, provides a work bench area for chores related to recycling such as sorting and binding. In addition, said container has a pair of wheels and a pair of handles to provide a means of easily moving it around the yard.

4 Claims, 2 Drawing Sheets

OUTDOOR CONTAINER FOR RECYCLING

This invention relates to an outdoor storage container especially well suited for the storage of recyclable household waste products such as paper, glass, plastic or aluminum cans.

BACKGROUND OF THE INVENTION

With the recycling of household waste products becoming more popular and mandated by the state in some areas, a growing problem has arisen concerning the handling and storage of such waste products. Using plastic trash bags, while common practice, has its drawbacks such as the inability to see the materials in the bags and therefore create confusion when storing a variety of recyclable products.

SUMMARY OF THE INVENTION

An object of the present invention is to overcome the abovestated problems by providing a mobile outdoor storage container which houses three smaller removable storage bins for the deposit of various recyclable household waste products such as paper, glass, plastic or aluminum cans. Another object of the present invention is to provide a suitable work surface for performing tasks related to recycling such as sorting and binding. Still another object is to provide a storage container which allows a person ease of mobility to the collection point of refuse company, also which allows ease of collection by refuse companies.

DESCRIPTION OF THE PREFERRED EMBODIMENT

Figures 1, 2, 3:
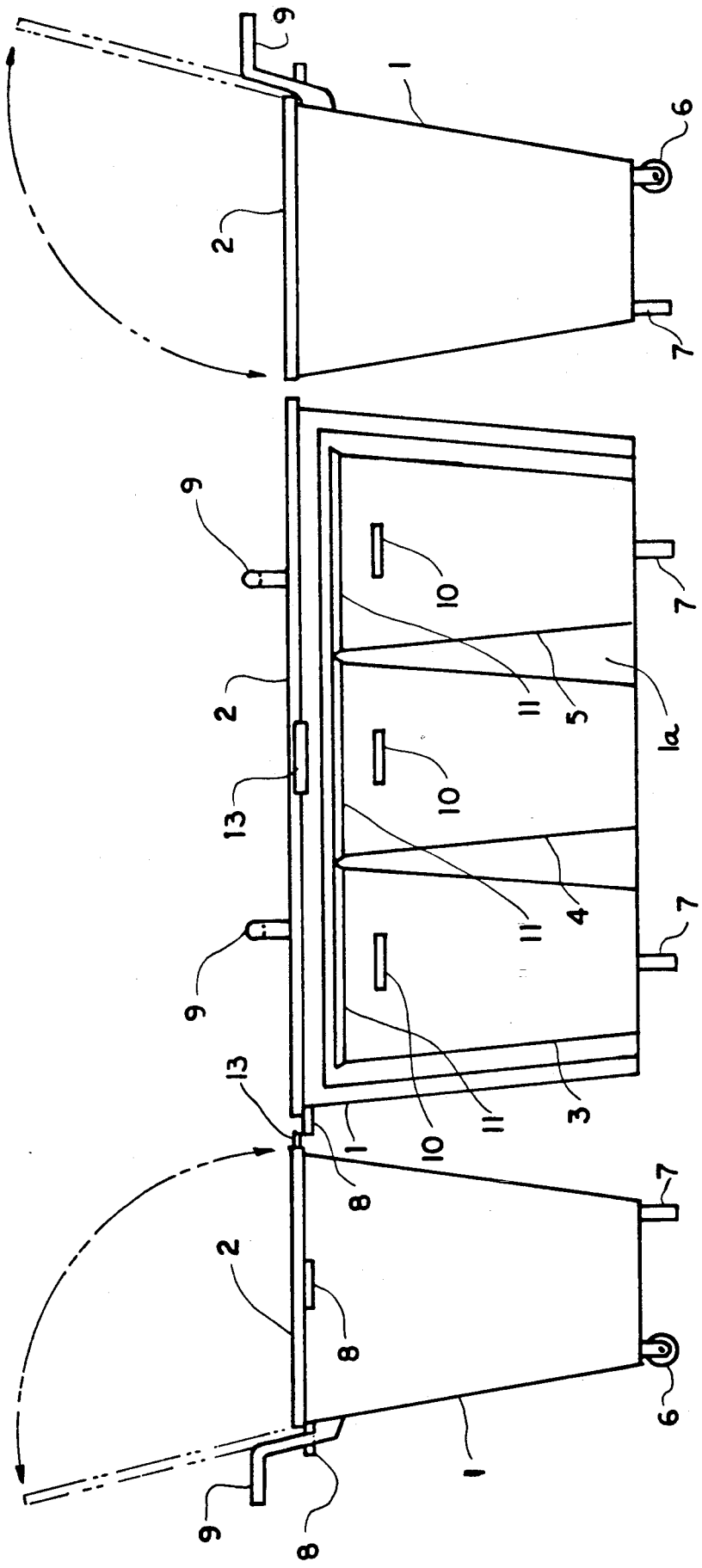
FIG. 1 is a side elevational view of the storage container.
FIG. 2 is a front elevational view of the storage container showing the three removable storage bins housed therein.
FIG. 3 is a side elevational view taken from the opposite side of that shown in FIG. 1.
Figure 4:
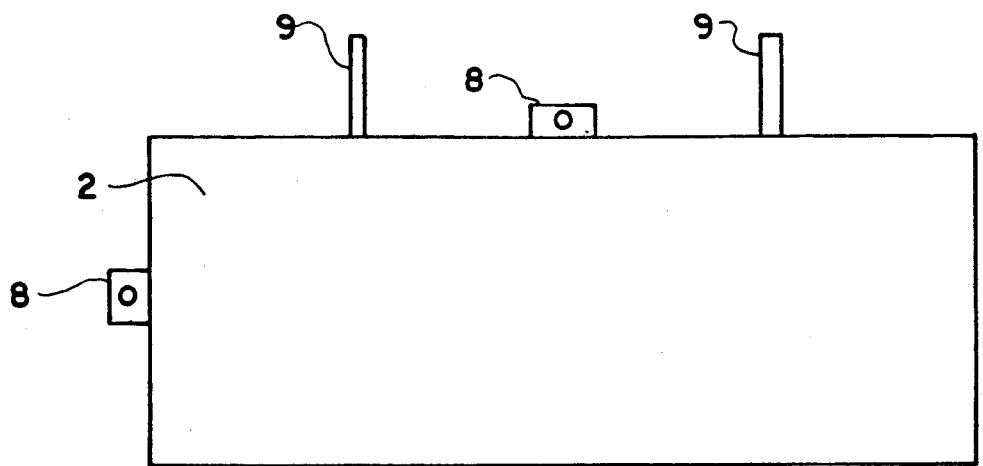
FIG. 4 is a top view of the storage container with its lid in the closed position.
Figure 5:
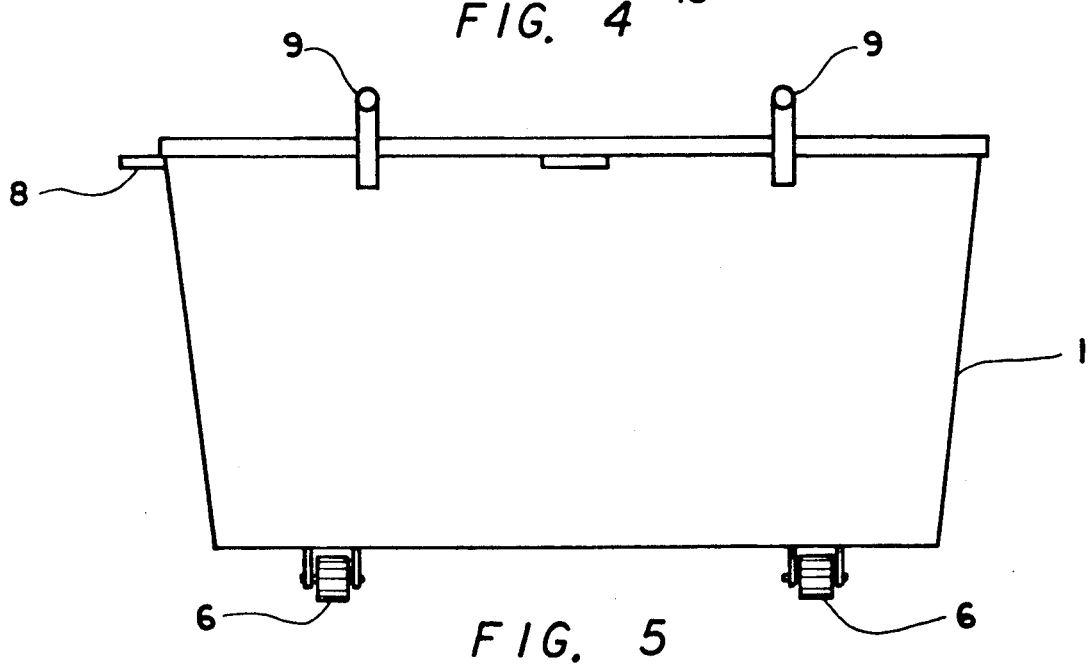
FIG. 5 is a rear elevational view of the storage container.

Referring to FIGS. 1-5, numeral 1 denotes a four sided, trapezoidal storage container having a hinged lid 2 with a handle 13. Three smaller, removable storage bins 3, 4 and 5 spaced at 1a, each having a pair of handles 10 and 10, and a reinforcing top collar 11, are housed in container 1, being slidably removable through the open front thereof.

A pair of wheels 6 and 6, are attached to the bottom rear portion of container 1 to make the container mobile for use around the yard. Legs 7 and 7 are located on the bottom front of said container 1 to give stability and prohibit the container from moving accidentally.

Figure 6:
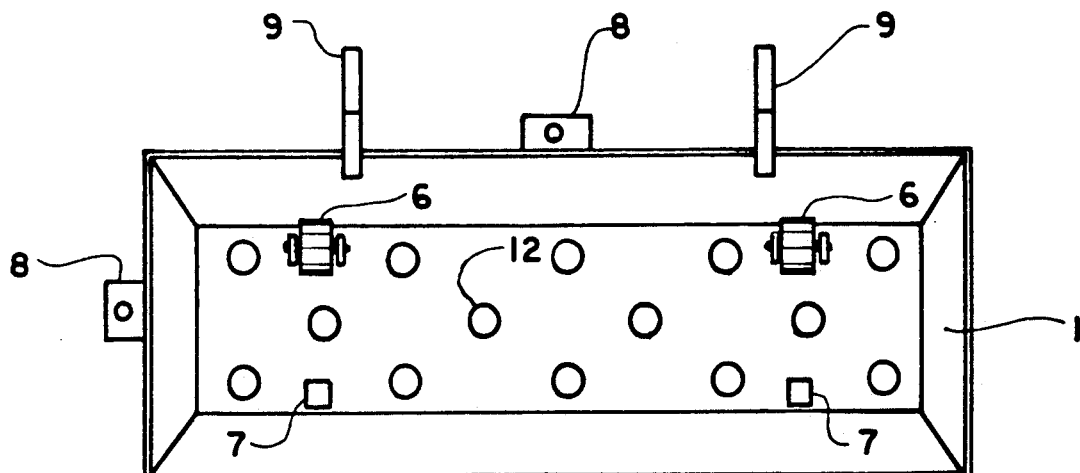
FIG. 6 is a top view of the storage container as viewed without a lid.

Referring to FIG. 6, numerals 8,8 denote two centrally bored, rectangular shelves for the supporting of equipment such as a spool of twine or a straight edge. A pair of handles 9 and 9 are attached to the upper back sidewall of container 1 to aid in the wheeling of the container from one part of the yard to another. In addition, handles 9 and 9 provide a stop for lid 2 when the lid is in the open position. Numeral 12 denotes a plurality of holes in the bottom portion of container 1 for drainage.

In operation, the container system is used to store recycled trash products such as glass, paper, plastic and aluminum cans. The top of the container, when in the closed position, serves as a work bench on which a person can separate the various waste products or perform tasks such as rolling and binding of old newspapers. Once the desired waste products have been separated they can be stored in one of the smaller storage bins.

While I have illustrated and described a single embodiment of my invention, it will be understood that this is by way of illustration only and that various changes and modifications may be contemplated in my invention within the scope of the following claims.

I claim:

1. A refuse container of trapezoidal shape on all four sides, the front side being open through its entire width, a plurality of trapezoidal cans in said container in side by side relationship along said width, each can having a handle on the front side, a lid extending throughout the entire width of said container and being pivoted adjacent the top, rear of said container, handle means rigidly secured to the upper rear portion of said container and having an angularly upwardly extending portion, serving as a stop for said lid when opened and having a handle shaped portion extending horizontally rearwardly from the top of said angularly upwardly extending portion.

2. A refuse container as recited in claim 1 together with a bottom and a pair of short legs attached to the bottom front thereof and a pair of short wheels attached to the bottom rear thereof.

3. A refuse container as recited in claim 2 wherein, said bottom portion has a multiplicity of holes for drainage.

4. A refuse container as recited in claim 2 together with a rectangular, centrally bored shelf extending horizontally outwardly from a side and rear of the top of said container for support equipment such as spools of twine or straight edges.

* * * * *